United States Patent [19]

Wright et al.

[11] Patent Number: 5,171,725

[45] Date of Patent: Dec. 15, 1992

[54] METHOD FOR PREPARING AQUEOUS MINERAL SUSPENSIONS

[75] Inventors: Tommy A. Wright, Tennille; Harvey M. Garrett, Sandersville; David F. Dwiggins, Tennille, all of Ga.

[73] Assignee: E.C.C. America Inc., Atlanta, Ga.

[21] Appl. No.: 725,023

[22] Filed: Jul. 3, 1991

[51] Int. Cl.$^5$ .............................................. C04B 33/04
[52] U.S. Cl. .................................... 501/149; 501/150
[58] Field of Search ........................ 501/145, 149, 150

[56] References Cited

U.S. PATENT DOCUMENTS

| | | |
|---|---|---|
| 3,853,983 | 12/1944 | Abercrombie, Jr. et al. ....... 501/150 |
| 3,961,971 | 6/1976 | Abercrombie, Jr. et al. ....... 501/150 |
| 4,246,039 | 1/1981 | Mixon, Jr. ............................ 501/150 |
| 4,623,398 | 11/1986 | Goodman et al. .................... 501/145 |
| 4,687,546 | 8/1987 | Willis ................................... 501/150 |
| 4,962,279 | 10/1990 | Anderson et al. ................... 501/150 |

Primary Examiner—Mark L. Bell
Assistant Examiner—Deborah Jones
Attorney, Agent, or Firm—Klauber & Jackson

[57] ABSTRACT

An improvement is disclosed applicable to systems where a mineral ore, such as a crude kaolin is introduced into a high shear, high energy mixing device with a suspending fluid and dispersing agents added to the same mixing device at controlled rates to produce a suspension with a solid content not more than 72% by weight. The process is applicable to systems where inorganic materials are suspended in a slurry, using water as the suspending fluid, in the presence of a dispersing agent, as for example in the processing of kaolin clay where the crude clay is formed into an aqueous suspension for the purpose of removing impurities and further processing. Heat is applied to the fluids in or before entering the mixing zone of the mixer, in sufficient quantity to raise the temperature of the suspension by at least 10° C. This lowers the flow resistance of fluids in the mixing zone. In consequence less energy is required per unit of material processed, and more material may be processed in a given mixing unit. The heat may be added by several different methods, both directly and indirectly.

8 Claims, 4 Drawing Sheets

METHOD FOR PREPARING AQUEOUS MINERAL SUSPENSIONS

BACKGROUND OF THE INVENTION

This invention relates generally to the processing of solids into slurries, more specifically to the processing of minerals into aqueous suspensions, and still more specifically to the processing of crude kaolin clay into an aqueous suspension.

Kaolin clay has many known applications in industry, including use as a filler in papermaking, a coating for paper, and a pigment for paint. However, crude kaolin clay ore typically contains various impurities which cause discoloration. Additionally, crude kaolin is typically too abrasive for direct use in these products. Therefore it is necessary to beneficiate the crude kaolin ore by various well-known commercial processes which increase the brightness of the kaolin particles and remove other impurities. In general, such processes for beneficiating crude kaolin clay ore require that the ore be processed as an aqueous slurry. Therefore, it is necessary as an early or initial step in so-called wet beneficiation of kaolins, to add substantial amounts of water to the dry crude kaolin clay ore to form a suspension or slurry.

Typically kaolin slurries, with solids contents less than 72% are prepared in a high shear, high energy mixing device, known to the industry as a blunger, in a process known as blunging. Crude kaolin clay ore, water and dispersing agents are simultaneously introduced into the blunger mixing chamber and subjected to strong agitation induced by a rotating blade and stationary baffle arrangement located in the lower portion of the blunger mixing chamber. In the upper portion of the mixing chamber is a series of perforated plates constructed in a cylindrical arrangement, which prevent agglomerated particles, not yet in suspension, from escaping the mixing chamber, while allowing the suspended product to overflow into a launder. The suspended product flows from the launder to a pump where it is typically pumped to degritting equipment for further processing.

SUMMARY OF THE INVENTION

Blungers are high energy mixers and therefore require relatively large amounts of power per unit of kaolin clay put in suspension, especially when producing suspensions in the higher solids content ranges. In accordance with the present invention, the process of forming an aqueous kaolin slurry from measured quantities of crude kaolin ore, water and certain dispersants in a high shear, high energy mixing device such as a blunger, is improved by raising the temperature of the materials in the blunger mixing zone, thereby reducing the resistance to flow in that zone.

In one embodiment of the present invention the temperature of the fluid in the mixing chamber is elevated by injecting steam directly into the mixing chamber of the blunger.

In a second embodiment of the invention an external heating device such as a steam jacket or an electric mantle attached to the outside of the blunger mixing chamber is used as a heat source.

In a third embodiment water and dispersing agents are heated in their respective holding tanks or combined in a common holding tank and heated before entering the mixing chamber.

In a fourth, presently preferred embodiment of the present invention, heat exchange devices are used to independently pass make-down water and the solution of dispersing agent in indirect heat relationship with a heating fluid prior to their entry into the blunger mixing chamber. The heated water and dispersing agent therefore raise the temperature of the fluid in the blunger mixing chamber through direct heat exchange contact with the crude kaolin clay ore.

The amount of heat energy added to the blunger mix is preferably sufficient to increase the temperature of the output suspension from the blunger by at least 10° C. Where the make-down water and solution of dispersant are pre-heated to provide such energy, they are typically heated to a temperature of 70° to 94° C. or even higher—up to the boiling point. It may be noted in this connection that while the prior art—see U.S. Pat. No. 4,962,279—discloses use of heat recovered from a calciner to (among other uses) heat water for feed to a blunger or for dilution of the blunger output, the temperatures used are very much lower than contemplated here and the heating techniques not suitable for the high degree of heating contemplated and required to achieve the purposes of the present invention.

DESCRIPTION OF THE PREFERRED EMBODIMENTS

Figure 1:
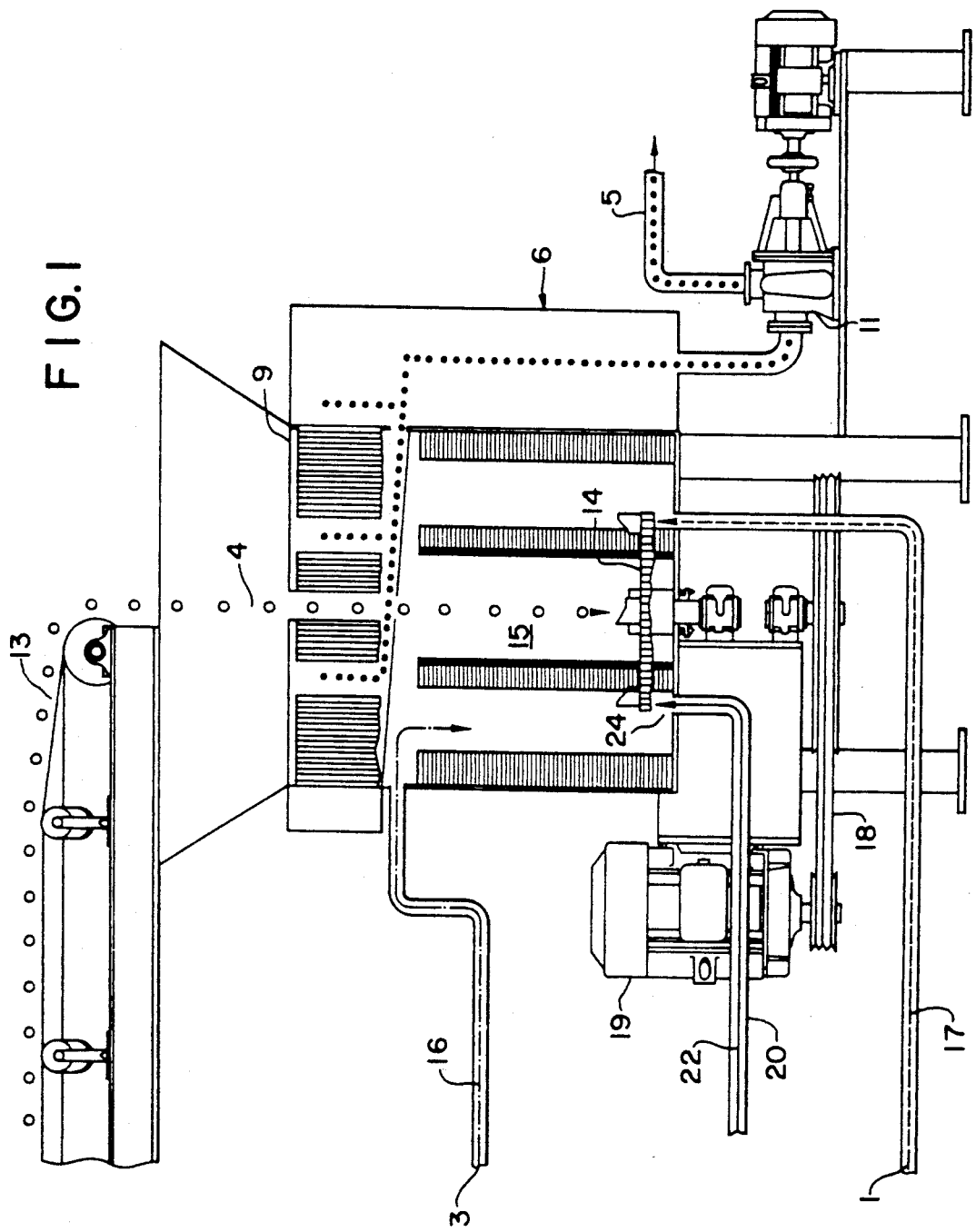
FIG. 1 is a schematic elevational view of a first embodiment of the invention, using direct steam injection.

In the several Figures herein, corresponding components in each of the Figures are identified by corresponding reference numerals. Referring particularly to FIG. 1, a blunger 6 is schematically shown, which is of conventional construction, the view being elevational, but schematic in nature as to show the interior elements. The material acted upon by blunger 6, is preferably a crude kaolin clay ore 4, which is seen to be delivered by a conveyor belt 13 so that it falls into the blunger, where a rotor 14 operated through an electrical or other motor 19 and drive belt 18 effects makedown of the crude material in the presence of the aqueous components which are added. In particular, water 1 is provided through an input line 17, and a dispersing agent 3 is provided independently through line 16, the dispersing agent being a conventional agent of this type known to be useful in the art, as for example organic polymeric dispersing agents sold under the trademarks DISPEX by Allied Colloids (water soluble salts of a polyacrylic or polymethacrylic acid), or similar compositions as are commonly used as dispersants in preparation of kaolin suspensions. After a sufficient amount of energy has been provided to the blunger to effect preparation of the initial aqueous suspension, such suspension 5 overflows the blunger 6 mixing chamber and passes through perforations 9 to the launder 10, and then is pumped by pump 11 to a suitable point for further beneficiation.

In accordance with the present invention, steam 22 which can, if desired, be superheated, is injected directly into the mixing chamber at the blunger by means of a conduit 20, which enters directly into the bottom of the said mixing chamber at 24.

Figure 2:
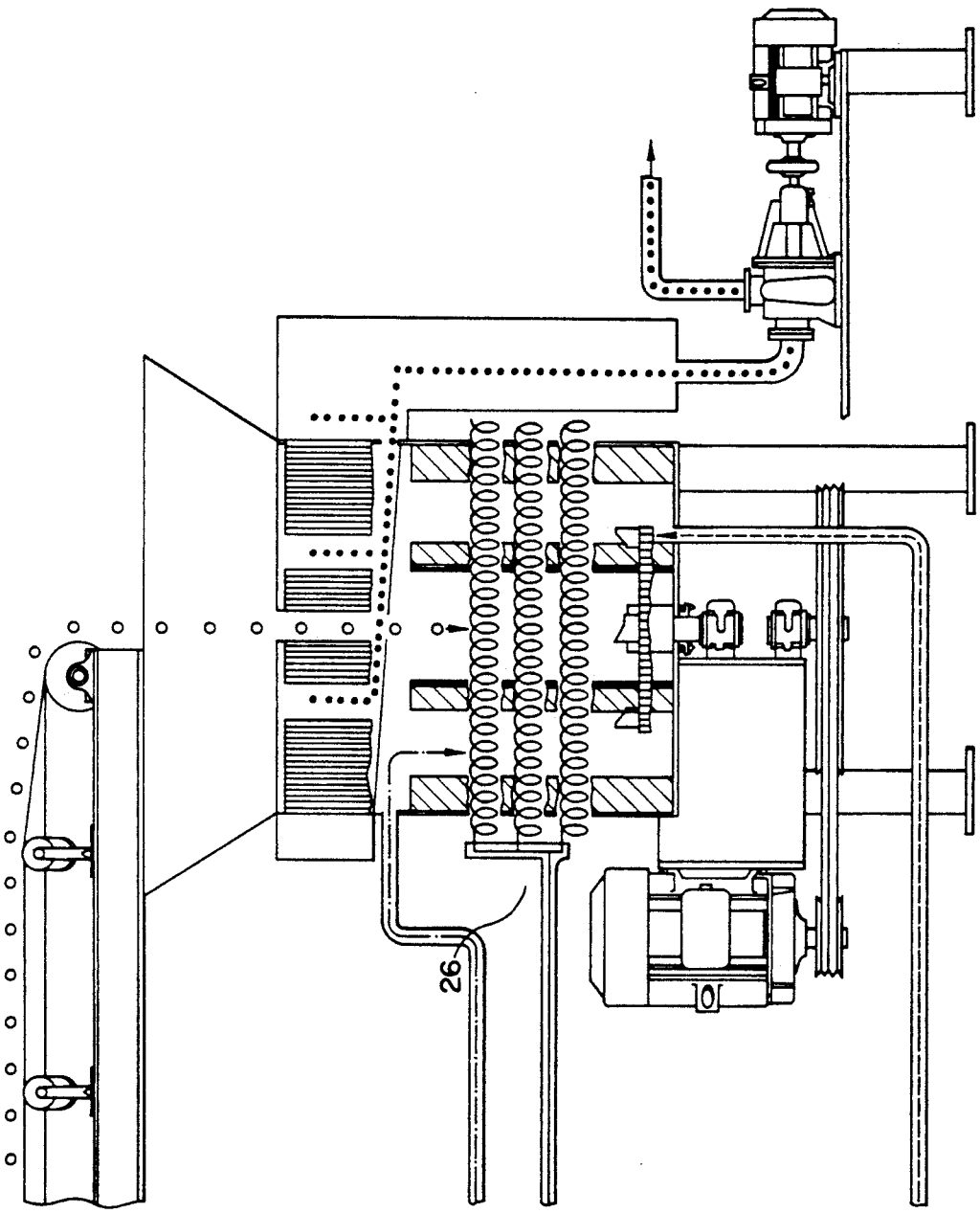
FIG. 2 is a schematic elevational view of a second embodiment of the invention, using an external heating device.

In FIG. 2, a substantially similar arrangement of components appears, except in this instance heating of the blunger to effect in turn heating of the contents of the mixing chamber is effected by a heating jacket generally indicated at 26, which may take the form of a steam or hot water jacket, or an electric mantle.

Figure 3:
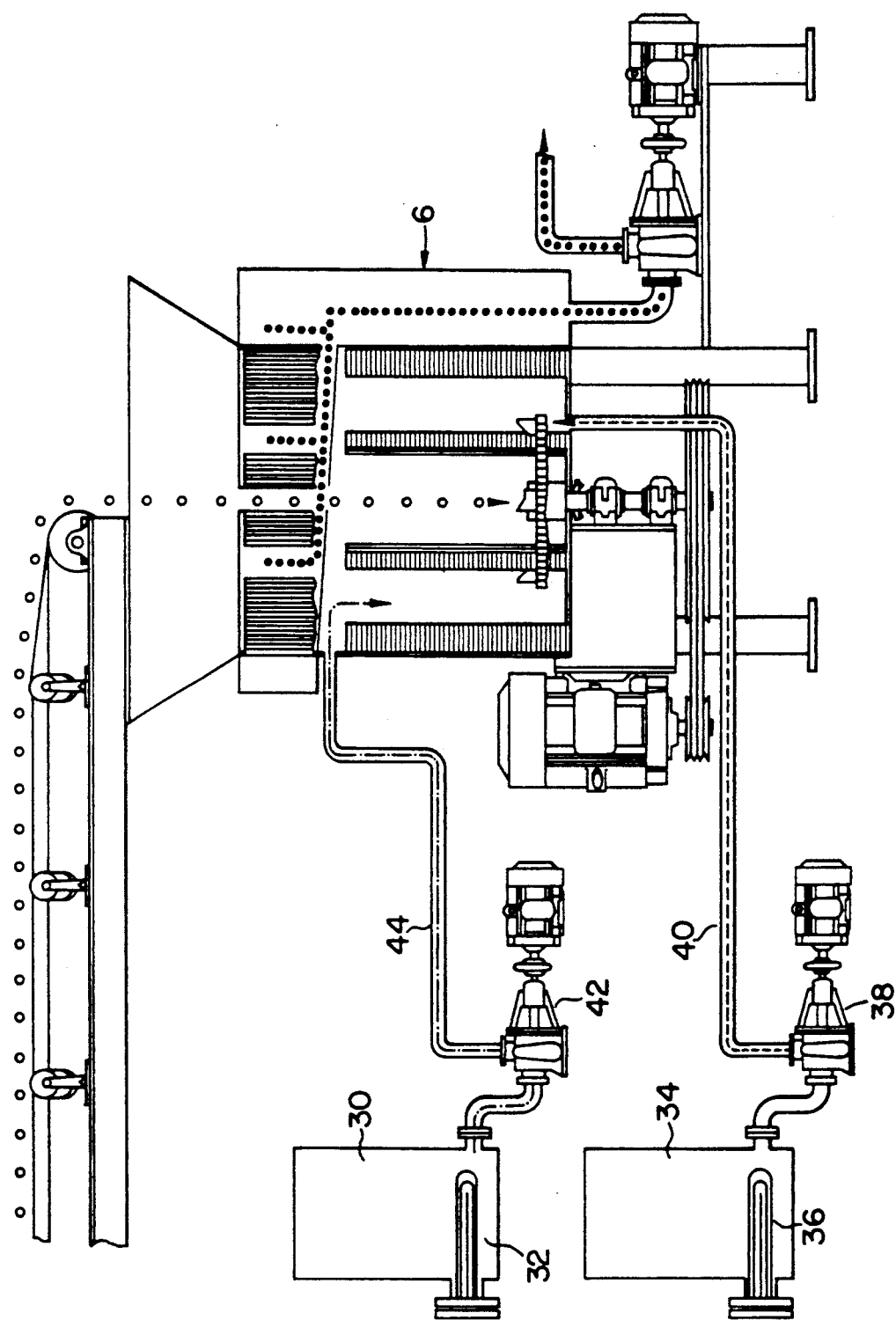
FIG. 3 is a schematic elevational view of a third embodiment of the invention, wherein water and dispersing agents are heated in their respective holding tanks before being combined at the blunger.

In FIG. 3, a third embodiment of the improvement of the invention is shown. In this instance the aqueous dispersing agent is provided to a holding tank 30, which is provided with a heating element 32 which can be electrical or otherwise as for example heated by steam. A separate water tank 34 is also provided which similarly includes a separate heating element 36 similar to element 32. The directly heated water is then provided to the blunger 6 via a pump 38 and input line 40, while the aqueous dispersing agent is similarly provided to the blunger tank by its own pump 42 and input conduit 44, to thereby result in heated products being provided to the input blunger.

In a presently preferred embodiment of the an indirect heat exchange relationship with a heating fluid 2 at a first heat exchange device 7, where its temperature is raised to a value of at least 70° C., more generally to the range of 70° to 94° C., but not over its boiling point before entering the mixing chamber 15 of blunger 6. Dispersing agent 3 is similarly passed in an indirect heat exchange relationship, with a heating fluid 20, at a second heat exchange device 7, where its temperature is raised to a value greater than 70° C., more generally to the range of 70° to 94° C., and not over its boiling point before entering the mixing chamber 15 of blunger 6. Crude kaolin clay ore 4 enters the mixing chamber of blunger 6 simultaneously with the heated water 1 and the heated dispersing agent 3, thus raising the temperature of the slurry in the mixing chamber of blunger 6. The aqueous suspension 5 overflows the blunger 6 mixing chamber and passes through the perforations 9 in the upper mixing chamber to the launder 10 and then is pumped away by pump 11 (driven by motor 12) for further beneficiation.

EXAMPLE

Figure 4:
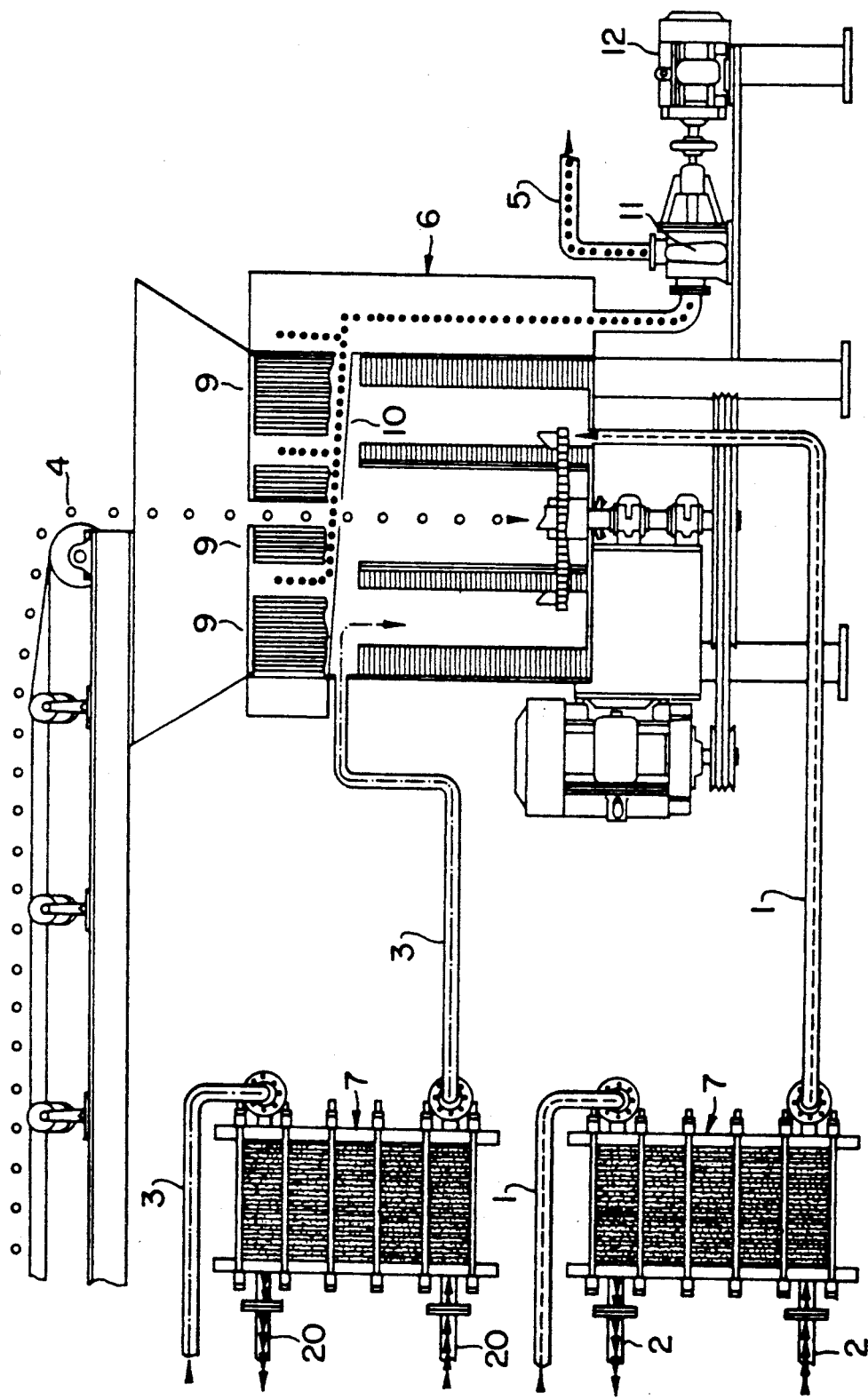
FIG. 4 is a schematic elevational view of a fourth embodiment of the improvement, wherein water and dispersing agents are passed independently in indirect heat exchange relationship with a heating fluid before entering the mixing chamber.

In an illustrative example, production rate and power consumption data were compiled daily during the operation of the embodiment of the process depicted in FIG. 4, and compared to production rate and power consumption data compiled on the same respective day during operation of the system using the same materials with no heat applied to the water or the dispersing agent. These data are presented in Table I and Table II. The data in Table II reflects heating of the aqueous dispersant solution to about 94° C. and heating of the makedown water to the range of about 70° C. to 94° C., before these components are provided to the blunger mixing zone.

TABLE I

Data Compiled with Unheated Water and Dispersing Agent

| | Unheated Slurry Deg. C. | Tons of Clay/Hr. Processed | KW Hr./ Ton |
|---|---|---|---|
| Day 1. | 34.4 | 26.4 | 9.64 |
| Day 2. | 32.8 | 25.9 | 9.82 |
| Day 3. | 33.9 | 28.1 | 9.05 |
| Day 4. | 34.4 | 29.5 | 9.00 |
| Day 5. | 34.4 | 28.5 | 9.24 |
| Day 6. | 34.4 | 27.7 | 9.18 |
| Day 7. | 35.0 | 26.9 | 9.45 |
| Day 8. | 35.0 | 26.9 | 9.59 |
| Average | 34.28 | 27.48 | 9.37 |

TABLE II

Data Compiled with Heated Water and Dispersing Agent

| | Heated Slurry Deg. C. | Tons of Clay/Hr. Processed | KW Hr./ Ton |
|---|---|---|---|
| Day 1. | 43.3 | 27.3 | 9.32 |
| Day 2. | 44.4 | 34.1 | 7.46 |
| Day 3. | 44.4 | 33.3 | 7.63 |
| Day 4. | 44.4 | 34.3 | 7.63 |
| Day 5. | 44.4 | 34.5 | 7.63 |
| Day 6. | 44.4 | 34.3 | 7.41 |
| Day 7. | 45.6 | 34.6 | 7.35 |
| Day 8. | 45.0 | 29.7 | 8.69 |
| Average | 44.49 | 32.76 | 7.89 |

Data compiled during the operation of the preferred embodiment shows that a 10.2° C. temperature increase in the mixing zone of a high shear, high energy mixing device yields a 19% production increase and a 19% decrease in power consumption per ton of material formed into the suspension.

It is understood that although FIGS. 1 through 4 depict specific methods and specific devices used to apply heat to slurry in the mixing chamber of the high shear, high energy mixer, that in fact any type or any combination of direct or indirect heating methods and devices may be used to provide heat to materials in or entering the mixing chamber.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. In the method for preparing an aqueous suspension of a kaolin clay by mixing the clay with makedown water and a dispersant in a high shear, high energy mixing device to form said suspension; the improvement which reduces the mixing energy required per unit weight of dry clay, comprising raising the temperature of the materials being acted upon in the mixing chamber of the mixing device by heating said makedown water to between 70° C. and boiling prior to its being incorporated into said suspension.

2. A method in accordance with claim 1, wherein the said temperature is raised by passing the make-down water used to form said aqueous suspension in indirect heat exchange with a heating media prior to feeding same to said chamber, to raise the temperature of said feed water to at least 94° C.

3. A method in accordance with claim 2, further including independently heating by indirect heat exchange with a heating media, an aqueous solution of said dispersing agent, and providing said thereby heated solution to said mixing zone to further facilitate formation of said suspension.

4. A method in accordance with claim 3, wherein said aqueous solution is heated to at least 94° C.

5. A method in accordance with claim 4, wherein the final said suspension formed at said mixing zone includes no more than 72% solids by weight.

6. A method in accordance with claim 4, wherein said heat energy added to the mixing zone increases the temperature of the suspension by at least 10° C.

7. In the method for preparing an aqueous suspension of a kaolin clay by mixing the clay with makedown water and a dispersant in a high shear, high energy mixing device to form said suspension; the improvement which reduces the mixing energy required per unit weight of dry clay, comprising raising the temperature of the said suspension at the mixing chamber of the mixing device by at least 10° C., by injecting steam directly into the bottom of said mixing chamber.

8. In the method for preparing an aqueous suspension of a lanolin clay by mixing the clay with makedown water and a dispersant in a high shear, high energy mixing device to form said suspension; the improvement which reduces the mixing energy required per unit weight of dry clay, comprising raising the temperature of the said suspension at the mixing chamber of the mixing device by at least 10° C., by heating the mixing chamber by an enveloping heating coil.

* * * * *